US012608554B2

(12) United States Patent
Jiang et al.

(10) Patent No.: US 12,608,554 B2
(45) Date of Patent: Apr. 21, 2026

(54) METHOD AND SYSTEM FOR UNDERSTANDING MEDICAL CHINESE SPOKEN LANGUAGE, ELECTRONIC DEVICE, AND STORAGE MEDIUM

(71) Applicant: Zhejiang Gongshang University, Hangzhou City (CN)

(72) Inventors: Bo Jiang, Hangzhou City (CN); Bo Xie, Hangzhou City (CN); Hua Zhang, Hangzhou City (CN); Xiaohui Jia, Hangzhou City (CN); Xiawen Song, Hangzhou City (CN)

(73) Assignee: Zhejiang Gongshang University, Hangzhou City (CN)

( * ) Notice: Subject to any disclaimer, the term of this patent is extended or adjusted under 35 U.S.C. 154(b) by 207 days.

(21) Appl. No.: 18/736,727

(22) Filed: Jun. 7, 2024

(65) Prior Publication Data

US 2025/0061281 A1 Feb. 20, 2025

(30) Foreign Application Priority Data

Jun. 9, 2023 (CN) .......................... 202310684530.1

(51) Int. Cl.
*G06F 40/30* (2020.01)
*G10L 15/06* (2013.01)
(Continued)

(52) U.S. Cl.
CPC ............ *G06F 40/30* (2020.01); *G10L 15/063* (2013.01); *G10L 15/16* (2013.01);
(Continued)

(58) Field of Classification Search
CPC ..... G10L 15/22; G10L 15/1822; G10L 15/16; G10L 15/26; G10L 15/063; G06F 40/30
See application file for complete search history.

(56) References Cited

U.S. PATENT DOCUMENTS

| | | | | |
|---|---|---|---|---|
| 10,262,062 B2 * | 4/2019 | Chang | ................. | G06F 16/3329 |
| 2019/0244603 A1 * | 8/2019 | Angkititrakul | ......... | G10L 15/16 |

(Continued)

OTHER PUBLICATIONS

Liu et al., "Cm-net: A novel collaborative memory network for spoken language understanding." arXiv preprint arXiv: 1909.06937 (Year: 2019).*

(Continued)

*Primary Examiner* — Samuel G Neway
(74) *Attorney, Agent, or Firm* — Edell, Shapiro & Finnan, LLC

(57) ABSTRACT

Provided are a method and system for understanding a medical Chinese spoken language, an electronic device, and a storage medium, which relate to the field of semantic understanding technologies. The method includes: inputting a concatenated first vector determined based on the first weighted vector matrix and the medical identification vector semantic representation matrix to an intent recognition model to obtain an intent recognition prediction value; constructing a slot filling question sentence based on the intent recognition prediction value and inputting the slot filling question sentence into a second semantic vector determining model to obtain a slot filling vector semantic representation matrix, thereby determining a concatenated second vector; and inputting the concatenated second vector into a slot filling model to obtain a slot filling prediction value. This improves accuracy of understanding the medical Chinese spoken language.

15 Claims, 1 Drawing Sheet

(51) Int. Cl.

| | |
|---|---|
| *G10L 15/16* | (2006.01) |
| *G10L 15/18* | (2013.01) |
| *G10L 15/22* | (2006.01) |
| *G10L 15/26* | (2006.01) |

(52) U.S. Cl.
CPC .......... *G10L 15/1822* (2013.01); *G10L 15/22* (2013.01); *G10L 15/26* (2013.01)

(56) References Cited

U.S. PATENT DOCUMENTS

| | | | |
|---|---|---|---|
| 2020/0043480 A1* | 2/2020 | Shen ........................ | G10L 15/22 |
| 2023/0069049 A1* | 3/2023 | Zhou ................... | G10L 15/1815 |
| 2023/0252982 A1* | 8/2023 | Gunaratna ............. | G10L 15/16 |
| | | | 704/200 |
| 2025/0061281 A1* | 2/2025 | Jiang ........................ | G10L 15/26 |

OTHER PUBLICATIONS

Haihong et al., "A novel bi-directional interrelated model for joint intent detection and slot filling." Proceedings of the 57th annual meeting of the association for computational linguistics (Year: 2019).*

Zhang et al., "A joint model of intent determination and slot filling for spoken language understanding." IJCAI. vol. 16. No. 2016 (Year: 2016).*

Qin et al., "A stack-propagation framework with token-level intent detection for spoken language understanding." arXiv preprint arXiv:1909.02188 (Year: 2019).*

Bo Xie et at; ReCoMIF: Reading comprehension based multi-source information fusion network for Chinese spoken language understanding; Information Fusion 96 (2023) 192-201.

* cited by examiner

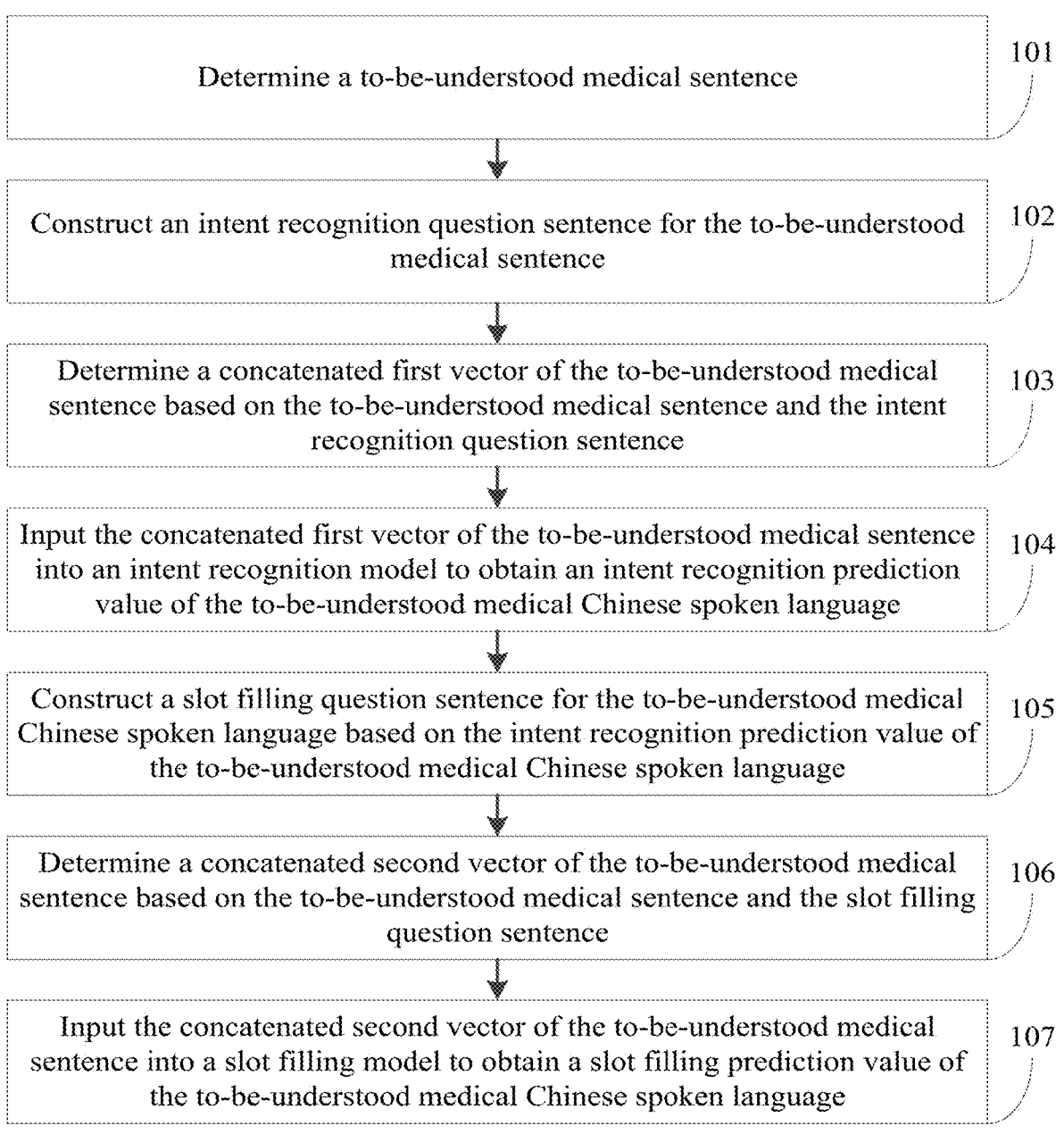

METHOD AND SYSTEM FOR UNDERSTANDING MEDICAL CHINESE SPOKEN LANGUAGE, ELECTRONIC DEVICE, AND STORAGE MEDIUM

CROSS REFERENCE TO RELATED APPLICATION

This patent application claims the benefit and priority of Chinese Patent Application No. 2023106845301 filed with the China National Intellectual Property Administration on Jun. 9, 2023, the disclosure of which is incorporated by reference herein in its entirety as part of the present application.

TECHNICAL FIELD

The present disclosure relates to the field of semantic understanding technologies, and in particular, to a method and system for understanding a medical Chinese spoken language, an electronic device, and a storage medium.

BACKGROUND

Natural language understanding (NLU) and speech recognition technologies are important research directions in the field of artificial intelligence in recent years. With widespread application of voice assistants and intelligent question answering (IQA) systems, these technologies are used in medical, educational, financial, and other fields. In the medical field, increasingly more people use a voice assistant to obtain health advice and guidance. For example, a patient may, by voice, ask about a prevention method and a treatment plan of diabetes, or ask about cold symptoms and medication recommendations. This interactive medical consultation manner requires the NLU technology to analyze a language of a user, to identify an intent and a need of the user, and provide a corresponding answer. Use of voice assistants can effectively alleviate a problem of medical shortage. For some patients with clear needs, this undoubtedly provides a convenient and affordable way to consult.

The NLU technology mainly includes two core tasks: intent recognition and slot filling. The intent recognition is to determine an intent of a user by classifying a language of the user. Slot filling is to identify and fill an entity and an attribute involved in an intent. For example, for a question "How to prevent diabetes?", an intent is "disease prevention", an involved entity is "diabetes", and an attribute is "prevention". In this case, it is necessary to perform corresponding slot filling. Therefore, the NLU technology has an important application value in the medical field, and is also an important development direction of future medical intelligence.

Previous studies have generally considered slot filling and intent recognition to be two independent tasks. For example, an intent recognition task is performed by using a recurrent neural network (RNN) and a Long-short Term Memory (LSTM) network. An LSTm1-based slot filling model considers a close relationship between intent recognition and slot filling. A gating mechanism explores a relationship between intent information and slot filling. E et al. developed a slot filling and intent detection (SFID) model, which enables the two tasks to promote each other to improve model performance. Qin et al. proposed a joint model with a stack propagation mechanism, which can incorporate intent information into slot filling to guide a filling process.

Although the foregoing models show good performance, they are generally used in the English text field. However, in the Chinese text field, especially in the field of spoken language understanding (SLU), more severe challenges are often faced. Words in Chinese are not clearly delimited as in English. Therefore, segmentation is usually performed by using a word segmentation tool, so that a model can better obtain lexical information. However, the segmentation tools do not have a uniform standard and are not completely accurate. If the segmentation tool is used to perform segmentation, a model effect is seriously affected. In addition, the foregoing model is not very interpretable, and has low accuracy in understanding a medical Chinese spoken language.

SUMMARY

The present disclosure aims to provide a method and a system for understanding a medical Chinese spoken language, an electronic device, and a storage medium, improving accuracy of understanding the medical Chinese spoken language.

To achieve the above objective, the present disclosure provides the following technical solutions.

A method for understanding a medical Chinese spoken language includes:

obtaining a to-be-understood medical Chinese spoken language;

converting the to-be-understood medical Chinese spoken language into Chinese text data to obtain a to-be-understood medical sentence;

constructing an intent recognition question sentence for the to-be-understood medical sentence;

inputting the to-be-understood medical sentence into a first semantic vector determining model to obtain a medical identification vector semantic representation matrix, where the medical identification vector semantic representation matrix includes X medical identification vector semantic representations, an xth medical identification vector semantic representation is a vector semantic representation of an xth medical identification character, and the xth medical identification character is an xth character in the to-be-understood medical sentence; and $X>1$, and $1 \leq x \leq X$;

inputting the intent recognition question sentence into the first semantic vector determining model to obtain an intent recognition vector semantic representation matrix, where the intent recognition vector semantic representation matrix includes m1 intent recognition vector semantic representations, an i1th intent recognition vector semantic representation is a vector semantic representation of an i1th intent recognition character, and the i1th intent recognition character is an i1th character in the intent recognition question sentence; and $m1>1$, and $1 \leq i1 \leq m1$;

determining a first weighted vector matrix of the to-be-understood medical sentence based on the medical identification vector semantic representation matrix and the intent recognition vector semantic representation matrix;

performing concatenation and a linear change on the first weighted vector matrix and the medical identification vector semantic representation matrix of the to-be-understood medical sentence to obtain a concatenated first vector of the to-be-understood medical sentence;

inputting the concatenated first vector of the to-be-understood medical sentence into an intent recognition model to obtain an intent recognition prediction value of the to-be-understood medical Chinese spoken language;

constructing a slot filling question sentence for the to-be-understood medical Chinese spoken language based on the intent recognition prediction value of the to-be-understood medical Chinese spoken language;

inputting the slot filling question sentence into a second semantic vector determining model to obtain a slot filling vector semantic representation matrix, where the slot filling vector semantic representation matrix includes m2 slot filling vector semantic representations, an i2th slot filling vector semantic representation is a vector semantic representation of an i2th slot filling character, and the i2th slot filling character is an i2th character in the slot filling question sentence; and m2>1, and 1≤i2≤m2;

determining a second weighted vector matrix of the to-be-understood medical sentence based on the medical identification vector semantic representation matrix and the slot filling vector semantic representation matrix;

performing concatenation and a linear change on the second weighted vector matrix and the medical identification vector semantic representation matrix of the to-be-understood medical sentence to obtain a concatenated second vector of the to-be-understood medical sentence; and inputting the concatenated second vector of the to-be-understood medical sentence into a slot filling model to obtain a slot filling prediction value of the to-be-understood medical Chinese spoken language;

where the first semantic vector determining model, the intent recognition model, the second semantic vector determining model, and the slot filling model are determined through training by using multiple training medical Chinese spoken languages, corresponding real intent labels, and real slot filling labels.

Optionally, the determining the first weighted vector matrix of the to-be-understood medical sentence based on the medical identification vector semantic representation matrix and the intent recognition vector semantic representation matrix includes:

calculating a first similarity between the i1th intent recognition character and the xth medical identification character based on the i1th intent recognition vector semantic representation and the xth medical identification vector semantic representation, to obtain a first similarity matrix of the to-be-understood medical sentence, where the first similarity matrix of the to-be-understood medical sentence includes X×m1 first similarities;

calculating a first attention score of the xth medical identification character with regard to the i1th intent recognition character based on the first similarity between the i1th intent recognition character and the xth medical identification character and the first similarity matrix of the to-be-understood medical sentence, to obtain a first attention score matrix of the to-be-understood medical sentence, where the first attention score matrix includes X×m1 first attention scores; and calculating a weighted first vector of the xth medical identification character based on m1 first attention scores and the xth medical identification vector semantic representation that are corresponding to the xth medical identification character, to obtain the first weighted vector matrix of the to-be-understood medical sentence, where the first weighted vector matrix of the to-be-understood medical sentence includes X weighted first vectors.

Optionally, determining the second weighted vector matrix of the to-be-understood medical sentence based on the medical identification vector semantic representation matrix and the slot filling vector semantic representation matrix includes:

calculating a second similarity between the i2th slot filling character and the xth medical identification character based on the i2th slot filling vector semantic representation and the xth medical identification vector semantic representation, to obtain a second similarity matrix of the to-be-understood medical sentence, where the second similarity matrix of the to-be-understood medical sentence includes X×m2 second similarities;

calculating a second attention score of the xth medical identification character with regard to the i2th slot filling character based on the second similarity between the i2th slot filling character and the xth medical identification character and the second similarity matrix of the to-be-understood medical sentence, to obtain a second attention score matrix of the to-be-understood medical sentence, where the second attention score matrix of the to-be-understood medical sentence includes X×m2 second attention scores; and calculating a weighted second vector of the xth medical identification character based on m2 second attention scores and the xth medical identification vector semantic representation that are corresponding to the xth medical identification character, to obtain the second weighted vector matrix of the to-be-understood medical sentence, where the second weighted vector matrix includes X weighted second vectors.

Optionally, a training process of the intent recognition model includes:

obtaining the multiple training medical Chinese spoken languages;

converting the training medical Chinese spoken languages into corresponding Chinese text data to obtain multiple sample sentences;

determining a real intent label of each sample sentence;

constructing a same intent recognition question sentence for each sample sentence; and training a Robustly Optimized Bidirectional Encoder Representations from Transformers Approach (RoBERTa) network with first model learnable parameters and an interactive attention network with first learnable parameters based on the intent recognition question sentence, all the sample sentences, and corresponding real intent labels by using a first cross-entropy loss function, to obtain the first semantic vector determining model and the intent recognition model.

Optionally, training the RoBERTa network with the first model learnable parameters and the interactive attention network with the first learnable parameters based on the intent recognition question sentence, all the sample sentences, and corresponding real intent labels by using the first cross-entropy loss function, to obtain the first semantic vector determining model and the intent recognition model includes:

for a current number of training times, for the intent recognition question sentence and any first current sample sentence, inputting the intent recognition question sentence into the RoBERTa network with the first model learnable parameters at the current number of training times, to obtain an intent recognition vector semantic representation matrix;

inputting the first current sample sentence into the ROBERTa network with the first model learnable parameter at the current number of training times, to obtain a first sample vector semantic representation matrix, where the first sample vector semantic representation matrix includes n1 first sample vector semantic representations, a j1th first sample vector semantic representation is a vector semantic representation of a j1th first sample character, and the j1th first sample character is a j1th character in the first current sample sentence; and n1>1, and 1≤j1≤n1;

calculating a first similarity between an i1th intent recognition character and the j1th first sample character based on an i1th intent recognition vector semantic representation and the j1th first sample vector semantic representation, to obtain a first similarity matrix of the first current sample sentence, where the first similarity matrix of the first current sample sentence includes n1×m1 first similarities;

calculating a first attention score of the j1th first sample character with regard to the i1th intent recognition character based on the first similarity between the i1th intent recognition character and the j1th first sample character and the first similarity matrix of the first current sample sentence, to obtain a first attention score matrix of the first current sample sentence, where the first attention score matrix of the first current sample sentence includes n1×m1 first attention scores;

calculating a weighted first vector of the j1th first sample character based on m1 first attention scores and the j1th first sample vector semantic representation that are corresponding to the j1th first sample character, to obtain a first weighted vector matrix of the first current sample sentence, where the first weighted vector matrix of the first current sample sentence includes n1 weighted first vectors;

performing concatenation and a linear change on the first sample vector semantic representation matrix and the first weighted vector matrix of the first current sample sentence to obtain a concatenated first vector of the first current sample sentence;

inputting the concatenated first vector of the first current sample sentence into the interactive attention network with the first learnable parameter at the current number of training times, to obtain an intent recognition prediction value of the first current sample sentence;

calculating a loss value between the intent recognition prediction value and a real intent label of the first current sample sentence, where the loss value is denoted as a first loss value;

determining whether a first stop condition is met, where the first stop condition is that the first loss value is less than a first preset value or a first preset number of training times is met; and in response to first stop condition being met, determining the ROBERTa network with the first model learnable parameters at the current number of training times as the first semantic vector determining model, and determining the interactive attention network with the first learnable parameters at the current number of training times as the intent recognition model; or in response to first stop condition not being met, updating the first model learnable parameters at the current number of training times and the first learnable parameters at the current number of training times, and returning the step of inputting the intent recognition question sentence into the ROBERTa network with the first model learnable parameters at the current number of training times, to obtain an intent recognition vector semantic representation matrix.

Optionally, a training process of the slot filling model includes:

separately inputting each sample sentence into the intent recognition model to obtain a corresponding intent recognition prediction value;

constructing a slot filling question sentence in a same form for each sample sentence based on the intent recognition prediction value of each sample sentence;

determining a real slot filling label of each sample sentence; and training a ROBERTa network with second model learnable parameters and an interactive attention network with second learnable parameters based on the slot filling question sentence, all the sample sentences, and corresponding real slot filling labels by using a second cross-entropy loss function, to obtain the second semantic vector determining model and the slot filling model.

Optionally, training the ROBERTa network with the second model learnable parameters and the interactive attention network with the second learnable parameters based on the slot filling question sentence, all the sample sentences, and corresponding real slot filling labels by using a second cross-entropy loss function, to obtain the second semantic vector determining model and the slot filling model includes:

for the slot filling question sentence and any second current sample sentence:

inputting the slot filling question sentence into the ROBERTa network with the second model learnable parameters at the current number of training times, to obtain a slot filling vector semantic representation matrix;

inputting the second current sample sentence into the ROBERTa network with the second model learnable parameter at the current number of training times, to obtain a second sample vector semantic representation matrix, where the second sample vector semantic representation matrix includes n2 second sample vector semantic representations, a j2th second sample vector semantic representation is a vector semantic representation of a j2th second sample character, and the j2th second sample character is a j2th character in the second current sample sentence; and n2>1, and 1≤j2≤n2;

calculating a second similarity between the i2th slot filling character and the j2th second sample character based on the i2th slot filling vector semantic representation and the j2th second sample vector semantic representation, to obtain a second similarity matrix of the second current sample sentence, where the second similarity matrix of the second current sample sentence includes n2×m2 second similarities;

calculating a second attention score of the j2th second sample character with regard to the i2th slot filling character based on the second similarity between the i2th slot filling character and the j2th second sample character and the second similarity matrix, to obtain a second attention score matrix of the second current sample sentence, where the second attention score matrix of the second current sample sentence includes n2×m2 second attention scores;

calculating a weighted second vector of the j2th second sample character based on m2 second attention scores and the j2th second sample vector semantic representation that are corresponding to the j2th second sample character, to obtain a second weighted vector matrix of the second current sample sentence, where the second weighted vector matrix includes n2 weighted second vectors;

performing concatenation and a linear change on the second sample vector semantic representation matrix and the second weighted vector matrix that are of the second current sample sentence to obtain a concatenated second vector of the second current sample sentence;

inputting the concatenated second vector of the second current sample sentence into the interactive attention network with the second learnable parameter at the current number of training times, to obtain a slot filling prediction value of the second current sample sentence;

calculating a loss value between the slot filling prediction value and a real slot filling label of the second current sample sentence, where the loss value is denoted as a second loss value;

determining whether a second stop condition is met, where the second stop condition is that the second loss value is less than a second preset value or a second preset number of training times is met; and in response to the second stop condition being met, determining the ROBERTa network with the second model learnable parameters at the current number of training times as the second semantic vector determining model, and determining the interactive attention network with the second learnable parameters at the current number of training times as the slot filling model; or in response to the second stop condition not being met, updating the second model learnable parameters at the current number of training times and the second learnable parameters at the current number of training times, and returning the step of inputting the slot filling question sentence into the ROBERTa network with the second model learnable parameters at the current number of training times, to obtain a slot filling vector semantic representation matrix.

A system for understanding a medical Chinese spoken language includes:

a spoken language obtaining module configured to obtain a to-be-understood medical Chinese spoken language;

a conversion module configured to convert the to-be-understood medical Chinese spoken language into Chinese text data to obtain a to-be-understood medical sentence;

a first question sentence constructing module configured to construct an intent recognition question sentence for the to-be-understood medical sentence;

a first vector matrix determining module configured to input the to-be-understood medical sentence into a first semantic vector determining model to obtain a medical identification vector semantic representation matrix, where the medical identification vector semantic representation matrix includes X medical identification vector semantic representations, an xth medical identification vector semantic representation is a vector semantic representation of an xth medical identification character, and the xth medical identification character is an xth character in the to-be-understood medical sentence; and X>1, and $1 \le x \le X$;

a second vector matrix determining module configured to input the intent recognition question sentence into the first semantic vector determining model to obtain an intent recognition vector semantic representation matrix, where the intent recognition vector semantic representation matrix includes m1 intent recognition vector semantic representations, an i1th intent recognition vector semantic representation is a vector semantic representation of an i1th intent recognition character, and the i1th intent recognition character is an i1th character in the intent recognition question sentence; and m1>1, and $1 \le i1 \le m1$;

a first weighting module configured to determine a first weighted vector matrix of the to-be-understood medical sentence based on the medical identification vector semantic representation matrix and the intent recognition vector semantic representation matrix;

a first concatenation module configured to perform concatenation and a linear change on the first weighted vector matrix and the medical identification vector semantic representation matrix of the to-be-understood medical sentence to obtain a concatenated first vector of the to-be-understood medical sentence;

an intent recognition module configured to input the concatenated first vector of the to-be-understood medical sentence into an intent recognition model to obtain an intent recognition prediction value of the to-be-understood medical Chinese spoken language;

a second question sentence constructing module configured to construct a slot filling question sentence for the to-be-understood medical Chinese spoken language based on the intent recognition prediction value of the to-be-understood medical Chinese spoken language;

a third vector matrix determining module configured to input the slot filling question sentence into a second semantic vector determining model to obtain a slot filling vector semantic representation matrix, where the slot filling vector semantic representation matrix includes m2 slot filling vector semantic representations, an i2th slot filling vector semantic representation is a vector semantic representation of an i2th slot filling character, and the i2th slot filling character is an i2th character in the slot filling question sentence; and m2>1, and $1 \le i2 \le m2$;

a second weighting module configured to determine a second weighted vector matrix of the to-be-understood medical sentence based on the medical identification vector semantic representation matrix and the slot filling vector semantic representation matrix;

a second concatenation module configured to perform concatenation and a linear change on the second weighted vector matrix and the medical identification vector semantic representation matrix of the to-be-understood medical sentence to obtain a concatenated second vector of the to-be-understood medical sentence; and a slot filling module configured to input the concatenated second vector of the to-be-understood medical sentence into a slot filling model to obtain a slot filling prediction value of the to-be-understood medical Chinese spoken language;

where the first semantic vector determining model, the intent recognition model, the second semantic vector determining model, and the slot filling model are determined through training by using multiple training medical Chinese spoken languages, corresponding real intent labels, and real slot filling labels.

An electronic device includes:

one or more processors; and a storage apparatus, where the storage apparatus stores one or more programs; and when the one or more programs are executed by the one or more processors, the one or more processors are enabled the method for understanding a medical Chinese spoken language as described above.

A storage medium is disclosed, the storage medium stores a computer program, and the computer program is executed by a processor to implement the method for understanding a medical Chinese spoken language as described above.

According to specific embodiments provided in the present disclosure, the present disclosure has the following technical effects:

The present disclosure provides a method and a system for understanding a medical Chinese spoken language, an electronic device, and a storage medium. Rich Chinese semantic vector representations are obtained by using ROBERTa, and intent recognition is combined with slot filling, improving accuracy of understanding the medical Chinese spoken language.

BRIEF DESCRIPTION OF THE DRAWINGS

To describe the technical solutions in embodiments of the present disclosure or in the conventional technology more clearly, the accompanying drawing required in the embodiments are briefly described below. Apparently, the accompanying drawing in the following description show merely some embodiments of the present disclosure, and other drawings can be derived from these accompanying drawing by those of ordinary skill in the art without creative efforts.

FIG. 1 is a schematic flowchart of a method for understanding a medical Chinese spoken language according to Embodiment 1 of the present disclosure.

DETAILED DESCRIPTION OF THE EMBODIMENTS

The technical solutions of the embodiments of the present disclosure are clearly and completely described below with reference to the drawing in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure aims to provide a method and a system for understanding a medical Chinese spoken language, an electronic device, and a storage medium, to improve accuracy of understanding the medical Chinese spoken language.

To make the above objective, features and advantages of the present disclosure clearer and more comprehensible, the present disclosure will be further described in detail below in combination with accompanying drawing and specific implementations.

Embodiment 1

FIG. 1 is a schematic flowchart of a method for understanding a medical Chinese spoken language according to Embodiment 1 of the present disclosure. As shown in FIG.

1, the method for understanding the medical Chinese spoken language in this embodiment includes the following steps:

Step 101: Determining a to-be-understood medical sentence. This step is specifically as follows:

obtaining a to-be-understood medical Chinese spoken language; and converting the to-be-understood medical Chinese spoken language into Chinese text data to obtain the to-be-understood medical sentence.

Step 102: Constructing an intent recognition question sentence for the to-be-understood medical sentence.

Step 103: Determining a concatenated first vector of the to-be-understood medical sentence based on the to-be-understood medical sentence and the intent recognition question sentence. This step is specifically as follows:

Step 1031: Inputting the to-be-understood medical sentence into a first semantic vector determining model to obtain a medical identification vector semantic representation matrix, where the medical identification vector semantic representation matrix includes X medical identification vector semantic representations, an xth medical identification vector semantic representation is a vector semantic representation of an xth medical identification character, and the xth medical identification character is an xth character in the to-be-understood medical sentence; and $X>1$, and $1 \leq x \leq X$.

Step 1032: Inputting the intent recognition question sentence into the first semantic vector determining model to obtain an intent recognition vector semantic representation matrix, where the intent recognition vector semantic representation matrix includes m1 intent recognition vector semantic representations, an i1th intent recognition vector semantic representation is a vector semantic representation of an i1th intent recognition character, and the i1th intent recognition character is an i1th character in the intent recognition question sentence; and $m1>1$, and $1 \leq i1 \leq m1$.

Step 1033: Determining a first weighted vector matrix of the to-be-understood medical sentence based on the medical identification vector semantic representation matrix and the intent recognition vector semantic representation matrix.

Step 1034: Performing concatenation and a linear change on the first weighted vector matrix and the medical identification vector semantic representation matrix of the to-be-understood medical sentence to obtain the concatenated first vector of the to-be-understood medical sentence.

Step 104: Inputting the concatenated first vector of the to-be-understood medical sentence into an intent recognition model to obtain an intent recognition prediction value of the to-be-understood medical Chinese spoken language.

Step 105: Constructing a slot filling question sentence for the to-be-understood medical Chinese spoken language based on the intent recognition prediction value of the to-be-understood medical Chinese spoken language.

Step 106: Determining a concatenated second vector of the to-be-understood medical sentence based on the to-be-understood medical sentence and the slot filling question sentence. This step is specifically as follows:

Step 1061: Inputting the slot filling question sentence into a second semantic vector determining model to obtain a slot filling vector semantic representation matrix, where the slot filling vector semantic representation matrix includes m2 slot filling vector semantic representations, an i2th slot filling vector semantic representation is a vector semantic representation of an i2th slot filling character, and the i2th slot filling character is an i2th character in the slot filling question sentence; and $m2>1$, and $1 \leq i2 \leq m2$.

Step 1062: Determining a second weighted vector matrix of the to-be-understood medical sentence based on the medical identification vector semantic representation matrix and the slot filling vector semantic representation matrix.

Step 1063: Performing concatenation and a linear change on the second weighted vector matrix and the medical identification vector semantic representation matrix of the to-be-understood medical sentence to obtain the concatenated second vector of the to-be-understood medical sentence.

Step 107: Inputting the concatenated second vector of the to-be-understood medical sentence into a slot filling model to obtain a slot filling prediction value of the to-be-understood medical Chinese spoken language.

Where the first semantic vector determining model, the intent recognition model, the second semantic vector determining model, and the slot filling model are determined through training by using multiple training medical Chinese spoken languages, corresponding real intent labels, and real slot filling labels.

As an optional implementation, step 1033 specifically includes the following sub-steps:

calculating a first similarity between the i1th intent recognition character and the xth medical identification character based on the i1th intent recognition vector semantic representation and the xth medical identification vector semantic representation, to obtain a first similarity matrix of the to-be-understood medical sentence, where the first similarity matrix of the to-be-understood medical sentence includes X×m1 first similarities;

calculating a first attention score of the xth medical identification character with regard to the i1th intent recognition character based on the first similarity between the i1th intent recognition character and the xth medical identification character and the first similarity matrix of the to-be-understood medical sentence, to obtain a first attention score matrix of the to-be-understood medical sentence, where the first attention score matrix includes X×m1 first attention scores; and calculating a weighted first vector of the xth medical identification character based on m1 first attention scores and the xth medical identification vector semantic representation that are corresponding to the xth medical identification character, to obtain the first weighted vector matrix of the to-be-understood medical sentence, where the first weighted vector matrix of the to-be-understood medical sentence includes X weighted first vectors.

As an optional implementation, step 1062 specifically includes the following sub-steps:

calculating a second similarity between the i2th slot filling character and the xth medical identification character based on the i2th slot filling vector semantic representation and the xth medical identification vector semantic representation, to obtain a second similarity matrix of the to-be-understood medical sentence, where the second similarity matrix of the to-be-understood medical sentence includes X×m2 second similarities;

calculating a second attention score of the xth medical identification character with regard to the i2th slot filling character based on the second similarity between the i2th slot filling character and the xth medical identification character and the second similarity matrix of the to-be-understood medical sentence, to obtain a second attention score matrix of the to-be-understood medical sentence, where the second attention score matrix of the to-be-understood medical sentence includes X×m2 second attention scores; and calculating a weighted second vector of the xth medical identification character based on m2 second attention scores and the xth medical identification vector semantic representation that are corresponding to the xth medical identification character, to obtain a second weighted vector matrix of the to-be-understood medical sentence, where the second weighted vector matrix includes X weighted second vectors.

As an optional implementation, a training process of the intent recognition model specifically includes:

obtaining the multiple training medical Chinese spoken languages;

converting each training medical Chinese spoken language into corresponding Chinese text data to obtain multiple sample sentences;

determining a real intent label of each sample sentence;

constructing a same intent recognition question sentence for each sample sentence; and training a ROBERTa network with a first model learnable parameters and an interactive attention network with a first learnable parameters based on the intent recognition question sentence, all the sample sentences, and corresponding real intent labels by using a first cross-entropy loss function, to obtain the first semantic vector determining model and the intent recognition model.

As an optional implementation, training the ROBERTa network with the first model learnable parameters and the interactive attention network with the first learnable parameters based on the intent recognition question sentence, all the sample sentences, and corresponding real intent labels by using the first cross-entropy loss function, to obtain the first semantic vector determining model and the intent recognition model specifically includes:

for a current number of training times, for the intent recognition question sentence and any first current sample sentence, inputting the intent recognition question sentence into the ROBERTa network with the first model learnable parameters at the current number of training times, to obtain an intent recognition vector semantic representation matrix;

inputting the first current sample sentence into the ROBERTa network with the first model learnable parameters at the current number of training times, to obtain a first sample vector semantic representation matrix, where the first sample vector semantic representation matrix includes n1 first sample vector semantic representations, a j1th first sample vector semantic representation is a vector semantic representation of a j1th first sample character, and the j1th first sample character is a j1th character in the first current sample sentence; and n1>1, and 1≤j1≤n1; and calculating a first similarity between an i1th intent recognition character and the j1th first sample character based on an i1th intent recognition vector semantic representation and the j1th first sample vector semantic representation, to obtain a first similarity matrix of the first current sample sentence, where the first similarity matrix of the first current sample sentence includes n1×m1 first similarities.

Specifically, a calculation formula for a similarity $S_{i,j}$ between an ith character in a sentence A and a jth character in a sentence B is as follows:

$$S_{i,j} = \frac{\left(h_i^A\right)^T \cdot \left(h_j^B\right)}{\sqrt{d}}, \forall\, i \in [1, m], j \in [1, n],$$

where $$h_i^A$$

is a vector semantic representation of the ith character in the sentence A;

$$h_j^B$$

is a vector semantic representation of the jth character in the sentence B; d is a dimension of a vector semantic representation; m indicates a total quantity of characters in the sentence A; and n indicates a total quantity of characters in the sentence B.

A first attention score of the j1th first sample character with regard to the i1th intent recognition character is calculated based on the first similarity between the i1th intent recognition character and the j1th first sample character and the first similarity matrix of the first current sample sentence, to obtain a first attention score matrix of the first current sample sentence, where the first attention score matrix of the first current sample sentence includes n1×m1 first attention scores.

Specifically, a calculation formula for an attention score $\alpha_{i,j}$ between the ith character in the sentence A and the jth character in the sentence B is as follows:

$$\alpha_{i,j} = \frac{\exp(S_{i,j})}{\sum_{k=1}^{m} \exp(S_{i,k})}, \forall i \in [1, m], j \in [1, n],$$

where k is a kth character in the sentence B.

A weighted first vector of the j1th first sample character is calculated based on m1 first attention scores and the j1th first sample vector semantic representation that are corresponding to the j1th first sample character, to obtain a first weighted vector matrix of the first current sample sentence, where the first weighted vector matrix of the first current sample sentence includes n1 weighted first vectors.

Specifically, a calculation formula for a weighted vector $\tilde{B}_i$ of the ith character in the sentence A is as follows:

$$\tilde{B}_i = \sum_{i=1}^{m} \alpha_{i,j} h_j^B, \forall j \in [1, n]$$

Concatenation and a linear change are performed on the first sample vector semantic representation matrix and the first weighted vector matrix of the first current sample sentence to obtain a concatenated first vector of the first current sample sentence.

Specifically, a calculation formula for a concatenated vector C in the sentence A is as follows:

$$C = ReLU(W[H^A; \tilde{B}]^T + b),$$

where ReLU is an activation function; W and b are to-be-learned parameters; $H^A$ is a vector semantic representation matrix of the sentence A, $$H^A = \{h_1^A, h_2^A, \ldots, h_n^A\}, h_1^A$$

is a vector semantic representation of a 1st character in the sentence A, $$h_2^A$$

is a vector semantic representation of a 2nd character in the sentence A, and $$h_n^A$$

is a vector semantic representation of an nth character in the sentence A; and $\tilde{B}$ is a weighted vector matrix of the sentence A, $\tilde{B} = \{\widetilde{B_1}, \widetilde{B_2}, \ldots, \widetilde{B_m}\}$, $\widetilde{B_1}$ is a weighted vector of the 1st character in the sentence A, $\widetilde{B_2}$ is a weighted vector of the 2nd character in the sentence A, and $\widetilde{B_m}$ is a weighted vector of an mth character in the sentence A.

The concatenated first vector of the first current sample sentence is input into the interactive attention network with the first learnable parameters at the current number of training times, to obtain an intent recognition prediction value of the first current sample sentence.

Specifically, a calculation formula for an intent recognition prediction value $h^{Intent}$ is as follows:

$$h^{Intent} = W_1 C^T + b_1,$$

where $W_1$ and $b_1$ are first learnable parameters.

A loss value between the intent recognition prediction value and a real intent label of the first current sample sentence is calculated, where the loss value is denoted as a first loss value.

Specifically, a calculation formula for a first loss value $\mathcal{L}_{intent}$ is as follows:

$$\mathcal{L}_{intent} = -\log P(\hat{y}^{intent} | h^{Intent}),$$

where $\hat{y}^{intent}$ is a real intent label.

It is determined whether a first stop condition is met, where the first stop condition is that the first loss value is less than a first preset value or a first preset number of training times is met; and if yes, the ROBERTa network with the first model learnable parameters at the current number of training times is determined as the first semantic vector determining model, and the interactive attention network with the first learnable parameters at the current number of training times is determined as the intent recognition model; or if no, the first model learnable parameters at the current number of training times and the first learnable parameters at the current number of training times are updated, and the operation returns to the step of inputting the intent recognition question sentence into the ROBERTa network with the first model learnable parameters at the current number of training times, to obtain an intent recognition vector semantic representation matrix.

As an optional implementation, a training process of the slot filling model specifically includes:

separately inputting each sample sentence into the intent recognition model to obtain a corresponding intent recognition prediction value;

constructing a slot filling question sentence in a same form for each sample sentence based on the intent recognition prediction value of each sample sentence;

determining a real slot filling label of each sample sentence; and training a ROBERTa network with second model learnable parameters and an interactive attention network with second learnable parameters based on the slot filling question sentence, all the sample sentences, and corresponding real slot filling labels by using a second cross-entropy loss function, to obtain the second semantic vector determining model and the slot filling model.

As an optional implementation, training the ROBERTa network with the second model learnable parameters and the interactive attention network with the second learnable parameters based on the slot filling question sentence, all the sample sentences, and corresponding real slot filling labels by using the second cross-entropy loss function, to obtain the second semantic vector determining model and the slot filling model specifically includes:

for the slot filling question sentence and any second current sample sentence:

inputting the slot filling question sentence into the ROBERTa network with the second model learnable parameters at current number of training times, to obtain a slot filling vector semantic representation matrix;

inputting the second current sample sentence into the ROBERTa network with the second model learnable parameters at the current number of training times, to obtain a second sample vector semantic representation matrix, where the second sample vector semantic representation matrix includes n2 second sample vector semantic representations, a j2th second sample vector semantic representation is a vector semantic representation of a j2th second sample character, and the j2th second sample character is a j2th character in the second current sample sentence; and n2>1, and $1 \leq j2 \leq n2$;

calculating a second similarity between an i2th slot filling character and the j2th second sample character based on an i2th slot filling vector semantic representation and the j2th second sample vector semantic representation, to obtain a second similarity matrix of the second current sample sentence, where the second similarity matrix of the second current sample sentence includes n2×m2 second similarities;

calculating a second attention score of the j2th second sample character with regard to the i2th slot filling character based on the second similarity between the i2th slot filling character and the j2th second sample character and the second similarity matrix, to obtain a second attention score matrix of the second current sample sentence, where the second attention score matrix of the second current sample sentence includes n2×m2 second attention scores;

calculating a weighted second vector of the j2th second sample character based on m2 second attention scores and the j2th second sample vector semantic representation that are corresponding to the j2th second sample character, to obtain a second weighted vector matrix of the second current sample sentence, where the second weighted vector matrix includes n2 weighted second vectors;

performing concatenation and a linear change on the second sample vector semantic representation matrix and the second weighted vector matrix that are of the second current sample sentence to obtain a concatenated second vector of the second current sample sentence; and inputting the concatenated second vector of the second current sample sentence into the interactive attention network with the second learnable parameters at the current number of training times, to obtain a slot filling prediction value of the second current sample sentence.

Specifically, a calculation formula for a slot filling prediction value $h^{slot}$ is as follows:

$$h^{slot} = W_2 C + b_2,$$

where $W_2$ and $b_2$ are second learnable parameters.

A loss value between the slot filling prediction value and a real slot filling label of the second current sample sentence is calculated, where the loss value is denoted as a second loss value.

Specifically, a calculation formula for a second loss value $\mathcal{L}_{slot}$ is as follows:

$$\mathcal{L}_{slot} = -\log P(\hat{y}^{slot} \mid h^{slot}),$$

where $\hat{y}^{slot}$ is a real slot filling label.

It is determined whether a second stop condition is met, where the second stop condition is that the second loss value is less than a second preset value or a second preset number of training times is met; and if yes, the ROBERTa network with the second model learnable parameters at the current number of training times is determined as the second semantic vector determining model, and the interactive attention network with the second learnable parameters at the current number of training times is determined as the slot filling model; or if no, the second model learnable parameters at the current number of training times and the second learnable parameters at the current number of training times are updated, and the operation returns to the step of inputting the slot filling question sentence into the ROBERTa network with second model learnable parameters at the current number of training times, to obtain a slot filling vector semantic representation matrix.

Embodiment 2

A system for understanding a medical Chinese spoken language in this embodiment includes:

a spoken language obtaining module configured to obtain a to-be-understood medical Chinese spoken language;

a conversion module configured to convert the to-be-understood medical Chinese spoken language into Chinese text data to obtain a to-be-understood medical sentence;

a first question sentence constructing module configured to construct an intent recognition question sentence for the to-be-understood medical sentence;

a first vector matrix determining module configured to input the to-be-understood medical sentence into a first semantic vector determining model to obtain a medical identification vector semantic representation matrix, where the medical identification vector semantic representation matrix includes X medical identification vector semantic representations, an xth medical identification vector semantic representation is a vector semantic representation of an xth medical identification character, and the xth medical identification character is an xth character in the to-be-understood medical sentence; and X>1, and $1 \leq x \leq X$;

a second vector matrix determining module configured to input the intent recognition question sentence into the first semantic vector determining model to obtain an intent recognition vector semantic representation matrix, where the intent recognition vector semantic representation matrix includes m1 intent recognition vector semantic representations, an i1th intent recognition vector semantic representation is a vector semantic representation of an i1th intent recognition character, and the i1th intent recognition character is an i1th character in the intent recognition question sentence; and m1>1, and $1 \leq i1 \leq m1$;

a first weighting module configured to determine a first weighted vector matrix of the to-be-understood medical sentence based on the medical identification vector semantic representation matrix and the intent recognition vector semantic representation matrix;

a first concatenation module configured to perform concatenation and a linear change on the first weighted vector matrix and the medical identification vector semantic representation matrix of the to-be-understood medical sentence to obtain a concatenated first vector of the to-be-understood medical sentence;

an intent recognition module configured to input the concatenated first vector of the to-be-understood medical sentence into an intent recognition model to obtain an intent recognition prediction value of the to-be-understood medical Chinese spoken language;

a second question sentence constructing module configured to construct a slot filling question sentence for the to-be-understood medical Chinese spoken language based on the intent recognition prediction value of the to-be-understood medical Chinese spoken language;

a third vector matrix determining module configured to input the slot filling question sentence into a second semantic vector determining model to obtain a slot filling vector semantic representation matrix, where the slot filling vector semantic representation matrix includes m2 slot filling vector semantic representations, an i2th slot filling vector semantic representation is a vector semantic representation of an i2th slot filling character, and the i2th slot filling character is an i2th character in the slot filling question sentence; and m2>1, and $1 \leq i2 \leq m2$;

a second weighting module configured to determine a second weighted vector matrix of the to-be-understood medical sentence based on the medical identification vector semantic representation matrix and the slot filling vector semantic representation matrix;

a second concatenation module configured to perform concatenation and a linear change on the second weighted vector matrix and the medical identification vector semantic representation matrix of the to-be-understood medical sentence to obtain a concatenated second vector of the to-be-understood medical sentence; and a slot filling module configured to input the concatenated second vector of the to-be-understood medical sentence into a slot filling model to obtain a slot filling prediction value of the to-be-understood medical Chinese spoken language.

Herein, the first semantic vector determining model, the intent recognition model, the second semantic vector determining model, and the slot filling model are determined through training by using multiple training medical Chinese spoken languages, corresponding real intent labels, and real slot filling labels.

Embodiment 3

An electronic device includes:

one or more processors; and a storage apparatus, where the storage apparatus stores one or more programs; and when the one or more programs are executed by the one or more processors, the one or more processors are enabled to implement the method for understanding a medical Chinese spoken language according to Embodiment 1.

Embodiment 4

A storage medium is disclosed, the storage medium stores a computer program, and the computer program is executed by a processor to implement the method for understanding a medical Chinese spoken language according to Embodiment 1.

Each embodiment in the description is described in a progressive mode, each embodiment focuses on differences from other embodiments, and references can be made to each other for the same and similar parts between embodiments. Since the system disclosed in an embodiment corresponds to the method disclosed in an embodiment, the description is relatively simple, and for related contents, references can be made to the description of the method.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of specific implementations and the scope of application in accordance with the ideas of the present disclosure. In conclusion, the content of the description shall not be construed as limitations to the present disclosure.

What is claimed is:

1. A method for understanding a medical Chinese spoken language, comprising:

obtaining a to-be-understood medical Chinese spoken language;

converting the to-be-understood medical Chinese spoken language into Chinese text data to obtain a to-be-understood medical sentence;

constructing an intent recognition question sentence for the to-be-understood medical sentence;

inputting the to-be-understood medical sentence into a first semantic vector determining model to obtain a medical identification vector semantic representation matrix, wherein the medical identification vector semantic representation matrix comprises X medical identification vector semantic representations, an xth medical identification vector semantic representation is a vector semantic representation of an xth medical identification character, and the xth medical identification character is an xth character in the to-be-understood medical sentence; and X>1, and $1 \leq x \leq X$;

inputting the intent recognition question sentence into the first semantic vector determining model to obtain an intent recognition vector semantic representation matrix, wherein the intent recognition vector semantic representation matrix comprises m1 intent recognition vector semantic representations, an i1th intent recognition vector semantic representation is a vector semantic representation of an i1th intent recognition character, and the i1th intent recognition character is an i1th character in the intent recognition question sentence; and m1>1, and $1 \leq i1 \leq m1$;

determining a first weighted vector matrix of the to-be-understood medical sentence based on the medical identification vector semantic representation matrix and the intent recognition vector semantic representation matrix;

performing concatenation and a linear change on the first weighted vector matrix and the medical identification vector semantic representation matrix of the to-be-understood medical sentence to obtain a concatenated first vector of the to-be-understood medical sentence;

inputting the concatenated first vector of the to-be-understood medical sentence into an intent recognition model to obtain an intent recognition prediction value of the to-be-understood medical Chinese spoken language;

constructing a slot filling question sentence for the to-be-understood medical Chinese spoken language based on the intent recognition prediction value of the to-be-understood medical Chinese spoken language;

inputting the slot filling question sentence into a second semantic vector determining model to obtain a slot filling vector semantic representation matrix, wherein the slot filling vector semantic representation matrix comprises m2 slot filling vector semantic representations, an i2th slot filling vector semantic representation is a vector semantic representation of an i2th slot filling character, and the i2th slot filling character is an i2th character in the slot filling question sentence; and m2>1, and $1 \leq i2 \leq m2$;

determining a second weighted vector matrix of the to-be-understood medical sentence based on the medical identification vector semantic representation matrix and the slot filling vector semantic representation matrix;

performing concatenation and a linear change on the second weighted vector matrix and the medical identification vector semantic representation matrix of the to-be-understood medical sentence to obtain a concatenated second vector of the to-be-understood medical sentence; and inputting the concatenated second vector of the to-be-understood medical sentence into a slot filling model to obtain a slot filling prediction value of the to-be-understood medical Chinese spoken language;

wherein the first semantic vector determining model, the intent recognition model, the second semantic vector determining model, and the slot filling model are determined through training by using multiple training medical Chinese spoken languages, corresponding real intent labels, and real slot filling labels.

2. The method for understanding the medical Chinese spoken language according to claim 1, wherein determining the first weighted vector matrix of the to-be-understood medical sentence based on the medical identification vector semantic representation matrix and the intent recognition vector semantic representation matrix comprises:

calculating a first similarity between the i1th intent recognition character and the xth medical identification character based on the i1th intent recognition vector semantic representation and the xth medical identification vector semantic representation, to obtain a first similarity matrix of the to-be-understood medical sentence, wherein the first similarity matrix of the to-be-understood medical sentence comprises X×m1 first similarities;

calculating a first attention score of the xth medical identification character with regard to the i1th intent recognition character based on the first similarity between the i1th intent recognition character and the xth medical identification character and the first similarity matrix of the to-be-understood medical sentence, to obtain a first attention score matrix of the to-be-understood medical sentence, wherein the first attention score matrix comprises X×m1 first attention scores; and calculating a weighted first vector of the xth medical identification character based on m1 first attention scores and the xth medical identification vector semantic representation that are corresponding to the xth medical identification character, to obtain the first weighted vector matrix of the to-be-understood medical sentence, wherein the first weighted vector matrix of the to-be-understood medical sentence comprises X weighted first vectors.

3. The method for understanding the medical Chinese spoken language according to claim 1, wherein determining the second weighted vector matrix of the to-be-understood medical sentence based on the medical identification vector semantic representation matrix and the slot filling vector semantic representation matrix comprises:

calculating a second similarity between the i2th slot filling character and the xth medical identification character based on the i2th slot filling vector semantic representation and the xth medical identification vector semantic representation, to obtain a second similarity matrix of the to-be-understood medical sentence, wherein the second similarity matrix of the to-be-understood medical sentence comprises X×m2 second similarities;

calculating a second attention score of the xth medical identification character with regard to the i2th slot filling character based on the second similarity between the i2th slot filling character and the xth medical identification character and the second similarity matrix of the to-be-understood medical sentence, to obtain a second attention score matrix of the to-be-understood medical sentence, wherein the second attention score matrix of the to-be-understood medical sentence comprises X×m2 second attention scores; and calculating a weighted second vector of the xth medical identification character based on m2 second attention scores and the xth medical identification vector semantic representation that are corresponding to the xth medical identification character, to obtain the second weighted vector matrix of the to-be-understood medical sentence, wherein the second weighted vector matrix comprises X weighted second vectors.

4. The method for understanding the medical Chinese spoken language according to claim 1, wherein a training process of the intent recognition model comprises:

obtaining the multiple training medical Chinese spoken languages;

converting the training medical Chinese spoken languages into corresponding Chinese text data to obtain multiple sample sentences;

determining a real intent label of each sample sentence;

constructing a same intent recognition question sentence for each sample sentence; and training a Robustly Optimized Bidirectional Encoder Representations from Transformers Approach (RO-BERTa) network with first model learnable parameters and an interactive attention network with first learnable parameters based on the intent recognition question sentence, all the sample sentences, and corresponding real intent labels, by using a first cross-entropy loss function, to obtain the first semantic vector determining model and the intent recognition model.

5. The method for understanding the medical Chinese spoken language according to claim 4, wherein training the ROBERTa network with the first model learnable parameters and the interactive attention network with the first learnable parameters based on the intent recognition question sentence, all the sample sentences, and corresponding real intent labels by using the first cross-entropy loss function, to obtain the first semantic vector determining model and the intent recognition model comprises:

for a current number of training times, for the intent recognition question sentence and any first current sample sentence, inputting the intent recognition question sentence into the ROBERTa network with the first model learnable parameters at the current number of training times, to obtain an intent recognition vector semantic representation matrix;

inputting the first current sample sentence into the ROBERTa network with the first model learnable parameters at the current number of training times, to obtain a first sample vector semantic representation matrix, wherein the first sample vector semantic representation matrix comprises n1 first sample vector semantic representations, a j1th first sample vector semantic representation is a vector semantic representation of a j1th first sample character, and the j1th first sample character is a j1th character in the first current sample sentence; and n1>1, and $1 \leq j1 \leq n1$;

calculating a first similarity between an i1th intent recognition character and the j1th first sample character based on an i1th intent recognition vector semantic representation and the j1th first sample vector semantic representation, to obtain a first similarity matrix of the first current sample sentence, wherein the first similarity matrix of the first current sample sentence comprises n1×m1 first similarities;

calculating a first attention score of the j1th first sample character with regard to the i1th intent recognition character based on the first similarity between the i1th intent recognition character and the j1th first sample character and the first similarity matrix of the first current sample sentence, to obtain a first attention score matrix of the first current sample sentence, wherein the first attention score matrix of the first current sample sentence comprises n1×m1 first attention scores;

calculating a weighted first vector of the j1th first sample character based on m1 first attention scores and the j1th first sample vector semantic representation that are corresponding to the j1th first sample character, to obtain a first weighted vector matrix of the first current sample sentence, wherein the first weighted vector matrix of the first current sample sentence comprises n1 weighted first vectors;

performing concatenation and a linear change on the first sample vector semantic representation matrix and the first weighted vector matrix of the first current sample sentence to obtain a concatenated first vector of the first current sample sentence;

inputting the concatenated first vector of the first current sample sentence into the interactive attention network with the first learnable parameters at the current number of training times, to obtain an intent recognition prediction value of the first current sample sentence;

calculating a loss value between the intent recognition prediction value and a real intent label of the first current sample sentence, wherein the loss value is denoted as a first loss value;

determining whether a first stop condition is met, wherein the first stop condition is that the first loss value is less than a first preset value or a first preset number of training times is met; and in response to first stop condition being met, determining the ROBERTa network with the first model learnable parameters at the current number of training times as the first semantic vector determining model, and determining the interactive attention network with the first learnable parameters at the current number of training times as the intent recognition model; or in response to first stop condition not being met, updating the first model learnable parameters at the current number of training times and the first learnable parameters at the current number of training times, and returning the step of inputting the intent recognition question sentence into the ROBERTa network with the first model learnable parameters at the current number of training times, to obtain an intent recognition vector semantic representation matrix.

6. The method for understanding the medical Chinese spoken language according to claim 4, wherein a training process of the slot filling model comprises:

separately inputting each sample sentence into the intent recognition model to obtain a corresponding intent recognition prediction value;

constructing a slot filling question sentence in a same form for each sample sentence based on the intent recognition prediction value of each sample sentence;

determining a real slot filling label of each sample sentence; and training a ROBERTa network with second model learnable parameters and an interactive attention network with second learnable parameters based on the slot filling question sentence, all the sample sentences, and corresponding real slot filling labels by using a second cross-entropy loss function, to obtain the second semantic vector determining model and the slot filling model.

7. The method for understanding the medical Chinese spoken language according to claim 6, wherein training the ROBERTa network with the second model learnable parameters and the interactive attention network with the second learnable parameters based on the slot filling question sentence, all the sample sentences, and corresponding real slot filling labels by using the second cross-entropy loss function, to obtain the second semantic vector determining model and the slot filling model comprises:

for the slot filling question sentence and any second current sample sentence:

inputting the slot filling question sentence into the ROBERTa network with the second model learnable parameters at the current number of training times, to obtain a slot filling vector semantic representation matrix;

inputting the second current sample sentence into the ROBERTa network with the second model learnable parameters at the current number of training times, to obtain a second sample vector semantic representation matrix, wherein the second sample vector semantic representation matrix comprises n2 second sample vector semantic representations, a j2th second sample vector semantic representation is a vector semantic representation of a j2th second sample character, and the j2th second sample character is a j2th character in the second current sample sentence; and n2>1, and $1 \leq j2 \leq n2$;

calculating a second similarity between the i2th slot filling character and the j2th second sample character based on the i2th slot filling vector semantic representation and the j2th second sample vector semantic representation, to obtain a second similarity matrix of the second current sample sentence, wherein the second similarity matrix of the second current sample sentence comprises n2×m2 second similarities;

calculating a second attention score of the j2th second sample character with regard to the i2th slot filling character based on the second similarity between the i2th slot filling character and the j2th second sample character and the second similarity matrix, to obtain a second attention score matrix of the second current sample sentence, wherein the second attention score matrix of the second current sample sentence comprises n2×m2 second attention scores;

calculating a weighted second vector of the j2th second sample character based on m2 second attention scores and the j2th second sample vector semantic representation that are corresponding to the j2th second sample character, to obtain a second weighted vector matrix of the second current sample sentence, wherein the second weighted vector matrix comprises n2 weighted second vectors;

performing concatenation and a linear change on the second sample vector semantic representation matrix and the second weighted vector matrix that are of the second current sample sentence to obtain a concatenated second vector of the second current sample sentence;

inputting the concatenated second vector of the second current sample sentence into the interactive attention network with the second learnable parameters at the current number of training times, to obtain a slot filling prediction value of the second current sample sentence;

calculating a loss value between the slot filling prediction value and a real slot filling label of the second current sample sentence, wherein the loss value is denoted as a second loss value;

determining whether a second stop condition is met, wherein the second stop condition is that the second loss value is less than a second preset value or a second preset number of training times is met; and in response to the second stop condition being met, determining the ROBERTa network with the second model learnable parameters at the current number of training times as the second semantic vector determining model, and determining the interactive attention network with the second learnable parameters at the current number of training times as the slot filling model; or in response to the second stop condition not being met, updating the second model learnable parameters at the current number of training times and the second learnable parameters at the current number of training times, and returning the step of inputting the slot filling question sentence into the ROBERTa network with the second model learnable parameters at the current number of training times, to obtain a slot filling vector semantic representation matrix.

8. A system for understanding a medical Chinese spoken language, comprising:

a spoken language obtaining module configured to obtain a to-be-understood medical Chinese spoken language;

a conversion module configured to convert the to-be-understood medical Chinese spoken language into Chinese text data to obtain a to-be-understood medical sentence;

a first question sentence constructing module configured to construct an intent recognition question sentence for the to-be-understood medical sentence;

a first vector matrix determining module configured to input the to-be-understood medical sentence into a first semantic vector determining model to obtain a medical identification vector semantic representation matrix, wherein the medical identification vector semantic representation matrix comprises X medical identification vector semantic representations, an xth medical identification vector semantic representation is a vector semantic representation of an xth medical identification character, and the xth medical identification character is an xth character in the to-be-understood medical sentence; and X>1, and $1 \leq x \leq X$;

a second vector matrix determining module configured to input the intent recognition question sentence into the first semantic vector determining model to obtain an intent recognition vector semantic representation matrix, wherein the intent recognition vector semantic representation matrix comprises m1 intent recognition vector semantic representations, an i1th intent recognition vector semantic representation is a vector semantic representation of an i1th intent recognition character, and the i1th intent recognition character is an i1th character in the intent recognition question sentence; and m1>1, and $1 \leq i1 \leq m1$;

a first weighting module configured to determine a first weighted vector matrix of the to-be-understood medical sentence based on the medical identification vector semantic representation matrix and the intent recognition vector semantic representation matrix;

a first concatenation module configured to perform concatenation and a linear change on the first weighted vector matrix and the medical identification vector semantic representation matrix of the to-be-understood medical sentence to obtain a concatenated first vector of the to-be-understood medical sentence;

an intent recognition module configured to input the concatenated first vector of the to-be-understood medical sentence into an intent recognition model to obtain an intent recognition prediction value of the to-be-understood medical Chinese spoken language;

a second question sentence constructing module configured to construct a slot filling question sentence for the to-be-understood medical Chinese spoken language based on the intent recognition prediction value of the to-be-understood medical Chinese spoken language;

a third vector matrix determining module configured to input the slot filling question sentence into a second semantic vector determining model to obtain a slot filling vector semantic representation matrix, wherein the slot filling vector semantic representation matrix comprises m2 slot filling vector semantic representations, an i2th slot filling vector semantic representation is a vector semantic representation of an i2th slot filling character, and the i2th slot filling character is an i2th character in the slot filling question sentence; and m2>1, and 1≤i2≤m2;

a second weighting module configured to determine a second weighted vector matrix of the to-be-understood medical sentence based on the medical identification vector semantic representation matrix and the slot filling vector semantic representation matrix;

a second concatenation module configured to perform concatenation and a linear change on the second weighted vector matrix and the medical identification vector semantic representation matrix of the to-be-understood medical sentence to obtain a concatenated second vector of the to-be-understood medical sentence; and a slot filling module configured to input the concatenated second vector of the to-be-understood medical sentence into a slot filling model to obtain a slot filling prediction value of the to-be-understood medical Chinese spoken language;

wherein the first semantic vector determining model, the intent recognition model, the second semantic vector determining model, and the slot filling model are determined through training by using multiple training medical Chinese spoken languages, corresponding real intent labels, and real slot filling labels.

9. An electronic device, comprising:

one or more processors; and a storage apparatus, wherein the storage apparatus stores one or more programs; and when the one or more programs are executed by the one or more processors, the one or more processors are enabled to implement the method for understanding a medical Chinese spoken language according to claim 1.

10. The electronic device according to claim 9, wherein determining the first weighted vector matrix of the to-be-understood medical sentence based on the medical identification vector semantic representation matrix and the intent recognition vector semantic representation matrix comprises:

calculating a first similarity between the i1th intent recognition character and the xth medical identification character based on the i1th intent recognition vector semantic representation and the xth medical identification vector semantic representation, to obtain a first similarity matrix of the to-be-understood medical sentence, wherein the first similarity matrix of the to-be-understood medical sentence comprises X×m1 first similarities;

calculating a first attention score of the xth medical identification character with regard to the i1th intent recognition character based on the first similarity between the i1th intent recognition character and the xth medical identification character and the first similarity matrix of the to-be-understood medical sentence, to obtain a first attention score matrix of the to-be-understood medical sentence, wherein the first attention score matrix comprises X×m1 first attention scores; and calculating a weighted first vector of the xth medical identification character based on m1 first attention scores and the xth medical identification vector semantic representation that are corresponding to the xth medical identification character, to obtain the first weighted vector matrix of the to-be-understood medical sentence, wherein the first weighted vector matrix of the to-be-understood medical sentence comprises X weighted first vectors.

11. The electronic device according to claim 9, wherein determining the second weighted vector matrix of the to-be-understood medical sentence based on the medical identification vector semantic representation matrix and the slot filling vector semantic representation matrix comprises:

calculating a second similarity between the i2th slot filling character and the xth medical identification character based on the i2th slot filling vector semantic representation and the xth medical identification vector semantic representation, to obtain a second similarity matrix of the to-be-understood medical sentence, wherein the second similarity matrix of the to-be-understood medical sentence comprises X×m2 second similarities;

calculating a second attention score of the xth medical identification character with regard to the i2th slot filling character based on the second similarity between the i2th slot filling character and the xth medical identification character and the second similarity matrix of the to-be-understood medical sentence, to obtain a second attention score matrix of the to-be-understood medical sentence, wherein the second attention score matrix of the to-be-understood medical sentence comprises X×m2 second attention scores; and calculating a weighted second vector of the xth medical identification character based on m2 second attention scores and the xth medical identification vector semantic representation that are corresponding to the xth medical identification character, to obtain the second weighted vector matrix of the to-be-understood medical sentence, wherein the second weighted vector matrix comprises X weighted second vectors.

12. The electronic device according to claim 9, wherein a training process of the intent recognition model comprises:

obtaining the multiple training medical Chinese spoken languages;

converting the training medical Chinese spoken languages into corresponding Chinese text data to obtain multiple sample sentences;

determining a real intent label of each sample sentence;

constructing a same intent recognition question sentence for each sample sentence; and training a Robustly Optimized Bidirectional Encoder Representations from Transformers Approach (RO-BERTa) network with first model learnable parameters and an interactive attention network with first learnable parameters based on the intent recognition question sentence, all the sample sentences, and corresponding real intent labels, by using a first cross-entropy loss function, to obtain the first semantic vector determining model and the intent recognition model.

13. The electronic device according to claim 12, wherein training the ROBERTa network with the first model learnable parameters and the interactive attention network with the first learnable parameters based on the intent recognition question sentence, all the sample sentences, and corresponding real intent labels by using the first cross-entropy loss function, to obtain the first semantic vector determining model and the intent recognition model comprises:

for a current number of training times, for the intent recognition question sentence and any first current sample sentence, inputting the intent recognition question sentence into the ROBERTa network with the first model learnable parameters at the current number of training times, to obtain an intent recognition vector semantic representation matrix;

inputting the first current sample sentence into the ROBERTa network with the first model learnable parameters at the current number of training times, to obtain a first sample vector semantic representation matrix, wherein the first sample vector semantic representation matrix comprises n1 first sample vector semantic representations, a j1th first sample vector semantic representation is a vector semantic representation of a j1th first sample character, and the j1th first sample character is a j1th character in the first current sample sentence; and n1>1, and 1≤j1≤n1;

calculating a first similarity between an i1th intent recognition character and the j1th first sample character based on an i1th intent recognition vector semantic representation and the j1th first sample vector semantic representation, to obtain a first similarity matrix of the first current sample sentence, wherein the first similarity matrix of the first current sample sentence comprises n1×m1 first similarities;

calculating a first attention score of the j1th first sample character with regard to the i1th intent recognition character based on the first similarity between the i1th intent recognition character and the j1th first sample character and the first similarity matrix of the first current sample sentence, to obtain a first attention score matrix of the first current sample sentence, wherein the first attention score matrix of the first current sample sentence comprises n1×m1 first attention scores;

calculating a weighted first vector of the j1th first sample character based on m1 first attention scores and the j1th first sample vector semantic representation that are corresponding to the j1th first sample character, to obtain a first weighted vector matrix of the first current sample sentence, wherein the first weighted vector matrix of the first current sample sentence comprises n1 weighted first vectors;

performing concatenation and a linear change on the first sample vector semantic representation matrix and the first weighted vector matrix of the first current sample sentence to obtain a concatenated first vector of the first current sample sentence;

inputting the concatenated first vector of the first current sample sentence into the interactive attention network with the first learnable parameters at the current number of training times, to obtain an intent recognition prediction value of the first current sample sentence;

calculating a loss value between the intent recognition prediction value and a real intent label of the first current sample sentence, wherein the loss value is denoted as a first loss value;

determining whether a first stop condition is met, wherein the first stop condition is that the first loss value is less than a first preset value or a first preset number of training times is met; and in response to first stop condition being met, determining the ROBERTa network with the first model learnable parameters at the current number of training times as the first semantic vector determining model, and determining the interactive attention network with the first learnable parameters at the current number of training times as the intent recognition model; or in response to first stop condition not being met, updating the first model learnable parameters at the current number of training times and the first learnable parameters at the current number of training times, and returning the step of inputting the intent recognition question sentence into the ROBERTa network with the first model learnable parameters at the current number of training times, to obtain an intent recognition vector semantic representation matrix.

14. The electronic device according to claim 12, wherein a training process of the slot filling model comprises:

separately inputting each sample sentence into the intent recognition model to obtain a corresponding intent recognition prediction value;

constructing a slot filling question sentence in a same form for each sample sentence based on the intent recognition prediction value of each sample sentence;

determining a real slot filling label of each sample sentence; and training a ROBERTa network with second model learnable parameters and an interactive attention network with second learnable parameters based on the slot filling question sentence, all the sample sentences, and corresponding real slot filling labels by using a second cross-entropy loss function, to obtain the second semantic vector determining model and the slot filling model.

15. The electronic device according to claim 14, wherein training the ROBERTa network with the second model learnable parameters and the interactive attention network with the second learnable parameters based on the slot filling question sentence, all the sample sentences, and corresponding real slot filling labels by using the second cross-entropy loss function, to obtain the second semantic vector determining model and the slot filling model comprises:

for the slot filling question sentence and any second current sample sentence:

inputting the slot filling question sentence into the RoBERTa network with the second model learnable parameters at the current number of training times, to obtain a slot filling vector semantic representation matrix;

inputting the second current sample sentence into the ROBERTa network with the second model learnable parameters at the current number of training times, to obtain a second sample vector semantic representation matrix, wherein the second sample vector semantic representation matrix comprises n2 second sample vector semantic representations, a j2th second sample vector semantic representation is a vector semantic representation of a j2th second sample character, and the j2th second sample character is a j2th character in the second current sample sentence; and n2>1, and 1≤j2≤n2;

calculating a second similarity between the i2th slot filling character and the j2th second sample character based on the i2th slot filling vector semantic representation and the j2th second sample vector semantic representation, to obtain a second similarity matrix of the second current sample sentence, wherein the second similarity matrix of the second current sample sentence comprises n2×m2 second similarities;

calculating a second attention score of the j2th second sample character with regard to the i2th slot filling character based on the second similarity between the i2th slot filling character and the j2th second sample character and the second similarity matrix, to obtain a second attention score matrix of the second current sample sentence, wherein the second attention score matrix of the second current sample sentence comprises n2×m2 second attention scores;

calculating a weighted second vector of the j2th second sample character based on m2 second attention scores and the j2th second sample vector semantic representation that are corresponding to the j2th second sample character, to obtain a second weighted vector matrix of the second current sample sentence, wherein the second weighted vector matrix comprises n2 weighted second vectors;

performing concatenation and a linear change on the second sample vector semantic representation matrix and the second weighted vector matrix that are of the second current sample sentence to obtain a concatenated second vector of the second current sample sentence;

inputting the concatenated second vector of the second current sample sentence into the interactive attention network with the second learnable parameters at the current number of training times, to obtain a slot filling prediction value of the second current sample sentence;

calculating a loss value between the slot filling prediction value and a real slot filling label of the second current sample sentence, wherein the loss value is denoted as a second loss value;

determining whether a second stop condition is met, wherein the second stop condition is that the second loss value is less than a second preset value or a second preset number of training times is met; and in response to the second stop condition being met, determining the ROBERTa network with the second model learnable parameters at the current number of training times as the second semantic vector determining model, and determining the interactive attention network with the second learnable parameters at the current number of training times as the slot filling model; or in response to the second stop condition not being met, updating the second model learnable parameters at the current number of training times and the second learnable parameters at the current number of training times, and returning the step of inputting the slot filling question sentence into the ROBERTa network with the second model learnable parameters at the current number of training times, to obtain a slot filling vector semantic representation matrix.

* * * * *